United States Patent [19]

Miller et al.

[11] Patent Number: 5,171,762
[45] Date of Patent: Dec. 15, 1992

[54] PROCESS FOR IMPROVING THE COLOR OF A POLYMER

[75] Inventors: Daniel R. Miller, Baton Rouge; Marshal S. Evans, Prairieville, both of La.

[73] Assignee: BASF Corporation, Parsippany, N.J.

[21] Appl. No.: 661,867

[22] Filed: Feb. 26, 1991

[51] Int. Cl.$^5$ .......................................... B29B 13/08
[52] U.S. Cl. ................... 522/162; 204/157.6; 204/901; 219/10.55 M; 264/26; 264/234; 264/345; 264/331.12; 425/174.8 E; 528/503
[58] Field of Search ............... 219/10.55 M, 10.57, 219/10.67; 264/22, 26, 234, 345, 331.12; 425/174.4, 174, 174.8 R, 174.8 E; 522/162; 528/503, 417; 204/157.6, 901

[56] References Cited

U.S. PATENT DOCUMENTS

| | | | |
|---|---|---|---|
| 3,519,517 | 7/1970 | Dench | 425/174.8 R |
| 3,702,811 | 11/1972 | Newsom et al. | 204/901 |
| 3,771,234 | 11/1973 | Forster et al. | 528/503 |
| 3,773,743 | 11/1973 | Ainsworth et al. | 528/503 |
| 3,859,493 | 1/1975 | Peterson | 264/345 |
| 4,023,279 | 5/1977 | Janda | 219/10.55 M |
| 4,067,942 | 1/1978 | Wilson | 264/345 |
| 4,187,368 | 2/1980 | Bekbulatov et al. | 264/331.12 |
| 4,189,566 | 2/1980 | Mueller et al. | 528/417 |
| 4,206,300 | 6/1980 | Talsma et al. | 528/503 |

FOREIGN PATENT DOCUMENTS 45-8759  3/1970  Japan ................... 264/22

*Primary Examiner*—Jeffery Thurlow
*Assistant Examiner*—Mathieu Vargot

[57] ABSTRACT

The color of a polymer, particularly polytetrahydrofuran, is improved by subjecting the polymer to microwave energy of such magnitude and frequency so as to cause a decrease in the APHA color number.

11 Claims, No Drawings

PROCESS FOR IMPROVING THE COLOR OF A POLYMER

BACKGROUND OF THE INVENTION

1. Field of the Invention

This invention relates to a method for improving the properties of polymers by subjecting them to microwave energy. Specifically, this invention relates to a method for improving the APHA color of a polymer, particularly polytetrahydrofuran by subjecting the polymer to microwave energy.

2. Background of the Invention

The use of microwave energy to treat polymers and their precursors for a variety of purposes is known. U.S. Pat. No. 4,356,071 to Fenton, for example, discloses the use of microwave heating to treat formaldehyde or trioxane prior to polymerization in order to obtain a more stable polymer.

U.S. Pat. No. 4,253,898 to Rinker et al. discloses the use of microwave energy to melt an adhesive composition interposed between and in contact with plastic components so as to cause bonding of the components.

U.S. Pat. No. 4,352,854 to Siedenstrang et al. discloses the use of microwaves to create a foamed rubber with a sponge like interior surrounded by a polymer skin.

U.S. Pat. No. 4,550,125 to Lee et al. discloses the use of microwaves to cure polyorganosiloxanes.

Polymers of tetrahydrofuran ("THF") are used in thermoplastics, castable urethanes, elastomers and spandex fiber. Many downstream applications of THF polymer require a low APHA color.

APHA color is an important characteristic of polymers which reflects the optical clarity of the polymer with respect to its yellowness. APHA color refers to a platinum-cobalt color standard as determined by ASTM 1045-58 which involves visual comparison of a liquid sample of the polymer with solutions having standard concentrations of potassium chloroplatinate and cobaltous chloride. Reduction of APHA color, i.e. reduction in yellowness, is desired because it affects the quality of the final product. Downstream users of polytetrahydrofuran generally mix it with additives, colorants, and other polymers which may be adversely affected by a high level of APHA color, hence the desirability of minimizing APHA color. Up to now, APHA color could be controlled only in the processing stage of polymer manufacture. We know of no method, other than that of the present invention, of treating a polymer after its manufacture to reduce APHA color. It has now been found that treating polymer with microwave radiation significantly improves the APHA color of the polymer.

SUMMARY OF THE INVENTION

A method is disclosed for improving the APHA color of polymers, particularly tetrahydrofuran polymer. The method comprises applying microwave energy to the polymer, the microwave energy being of such frequency and magnitude to cause a measurable reduction in APHA number. Preferably, the microwave frequency is in the range of about 2000 MHz to 3000 MHz.

DETAILED DESCRIPTION OF THE PREFERRED EMBODIMENTS

The present invention is a method of reducing the APHA color of polymers, particularly homopolymers and copolymers of tetrahydrofuran, by exposing the polymer to microwave radiation. As used herein, the terms "polytetrahydrofuran", "tetrahydrofuran polymer", "PTHF" and "THF polymer" are used synonymously and encompass both homopolymers and copolymers of THF.

Tetrahydrofuran, $(CH_2)_4O$, is a cyclic ether containing four methylene groups ($-CH_2-$) joined by an oxygen atom. It can be polymerized to a linear polytetrahydrofuran. With terminal hydroxyl groups the polymer is polytetramethylene ether glycol (PTMEG):

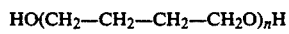

$$HO(CH_2-CH_2-CH_2-CH_2O)_nH$$

The hydroxyl groups in polytetrahydrofuran need not be terminal and may be wholly or partially substituted with other groups to form different polymers.

The solid THF polymers are semicrystalline materials with a relatively low melting point: generally about 43° C. for PTHF elastomers. Low molecular weight THF polymers can also be liquid at room temperature. Both liquid and solid THF polymers can undergo improvement in APHA color in accordance with the method of the present invention.

Chemically, polytetrahydrofuran comprises a series of aliphatic ether units. It is subject to oxidative degradation which can be inhibited by antioxidants. Ionizing radiation also degrades polytetrahydrofuran.

The term "microwave radiation" or "microwave" as used herein is defined as electro-magnetic radiation characterized by a frequency range extending from 300,000 Mhz to 1000 Mhz, or 1 millimeter (mm) to 30 centimeters (cm) in wavelength. Microwave frequencies between 2000 and 3000 Mhz are preferred.

It has been found that when PTHF samples are treated with microwave energy there is a significant improvement, i.e. decrease, of the APHA color number.

In general, the microwave treatment of the materials is carried out for such length of time and at such power level as is effective for producing a desired change in APHA color without causing degradation of the polymer. The duration and power level of the treatment will vary depending on the nature and size of the sample being treated and the frequency of the microwaves being used.

Normally, microwave generators are available in the wattage range of from about 450 to 700 watts.

The invention is more concretely described with reference to the examples below wherein all parts and percentages are by weight unless otherwise specified. The examples are provided to illustrate the present invention and not to limit it.

In all experiments set forth below, the microwave source used was a standard commercially available microwave oven operating at a frequency of 2450 Mhz and a maximum output of 600 watts.

As used herein, the term "acid number" refers to the measure of free acid content of a substance. It is expressed as the amount in milligrams of potassium hydroxide (KOH) which is neutralized by the acid in one gram of the substance. Said number is determined in accordance with ASTM P-2849-69. A change in acid number generally indicates a chemical change in this characteristic.

The term "hydroxyl number" is a measure of the hydroxyl groups (OH—) in an organic substance. Hydroxyl number is determined in accordance with ASTM P-2849-69. A change in the hydroxyl number indicates a chemical change in this particular characteristic.

The tetrahydrofuran polymer samples employed in the examples below are commercially available and typically have the properties as set forth in Table 1.

TABLE 1

| Typical Characteristics of Polytetrahydrofuran | | |
|---|---|---|
| | 1000 MOLECULAR WEIGHT | 2000 MOLECULAR WEIGHT |
| Molecular Weight | 1000 ± 25 g/mole | 2000 ± 50 g/mole |
| APHA Color | 45 | 55 |
| Acid Number | 0.011–0.014 | 0.011–0.014 |
| Hydroxyl Number | 109–115 | 54–58 |
| Softening Point | 26° C. | 35° C. |
| Flash Point | 240° C. | 246° C. |
| Density @ 30° C. (g/cc) | 0.982 | — |
| 40° C. | 0.975 | 0.973 |
| 75° C. | 0.952 | 0.949 |
| 100° C. | 0.935 | 0.931 |
| Viscosity @ 30° C. (mPa's) | 440 | — |
| 40° C. | 288 | 1270 |
| 75° C. | 79 | 330 |
| 100° C. | 46 | 160 |

EXAMPLE 1

Two polytetrahydrofuran samples, each sample being approximately one pint in quantity and of about 1000 molecular weight were melted. One sample was melted using a conventional thermal oven. The other sample was melted by means of a microwave oven which was commercially available from C.E.M. Corp. (Model MDS-81D). The microwave oven was operated at the maximum power level of 600 watts for 10 minutes. APHA color, acid number and hydroxyl number were determined using standard testing methods as discussed above.

The test results are set forth in Table 2 below.

TABLE 2

| Properties of Molten Samples of Poly THF (1000 molecular weight) | | |
|---|---|---|
| | Conventional Heating | Microwave Heating |
| APHA Color | 45 | 35 |
| Acid Number | 0.013 | 0.025 |
| Hydroxyl Number | 110.1 | 111.5 |

As can be seen, microwave heating produced a substantial improvement in color (as indicated by reduction of the APHA number). More particularly, a drop in 10 APHA color points was observed. Conventional thermal heating produced substantially no change in APHA color. A greater acid number was observed for microwave heating although the hydroxyl number was substantially the same for both conventional and microwave heating, indicating that the molecular weight was not altered and no chemical breakdown of the poly-THF was observed.

EXAMPLE 2

Two polytetrahydrofuran samples of about 2000 molecular weight were melted in accordance with the procedure of Example 1. The test results are given below in Table 3:

TABLE 3

| Properties of Molten Samples of Poly THF (2000 molecular weight) | | |
|---|---|---|
| | Conventional Heating | Microwave Heating |
| APHA Color | 55 | 45 |
| Acid Number | 0.012 | 0.019 |
| Hydroxyl Number | 55.6 | 55.4 |

As can be seen, a significant improvement in the color of polytetrahydrofuran was observed for microwave heating as opposed to no improvement for conventional thermal heating. More particularly, a drop of 10 APHA color points was observed. Somewhat greater acid number was observed for microwave heating. Again, hydroxyl numbers of conventional heating and microwave heating were about the same.

In the examples the microwave energy was sufficient to melt solid samples of the THF polymer. However, the polymer need not be a solid at ambient temperature Liquid samples of THF polymer may be treated with microwave energy in accordance with the present invention. Hence the present invention is not limited to melting solid samples.

What is claimed is:

1. A method for improving the color and reducing the yellowness of a polymer, said method comprising:
   applying microwave energy to the polymer, said microwave energy being of such frequency and magnitude so as to cause a measurable reduction of the APHA number of said polymer, said polymer including at least two groups having the formula:

   —(CH₂—CH₂—CH₂—CH₂O)—.

2. The method of claim 1 wherein said polymer is a homopolymer and/or copolymer of tetrahydrofuran.

3. The method of claim 2 wherein the tetrahydrofuran polymer has a molecular weight of from about 1000 to about 2000.

4. The method of claim 1 wherein said microwave energy is characterized by a frequency of from about 2000 Mhz to about 3000 Mhz.

5. The method of claim 1 wherein said microwave energy is supplied by a microwave oven having a rating of from about 450 to about 700 watts.

6. The method of claim 2 wherein said microwave energy causes a reduction in APHA number of up to about 10 APHA color points.

7. A method for improving the color and reducing the yellowness of solid polymer of tetrahydrofuran, said method comprising:
applying microwave energy to the polymer, said microwave energy being sufficient to melt the tetrahydrofuran polymer, and said method resulting in a measurably lower APHA color number for said polymer.

8. The method of claim 7 wherein the APHA color number achieved by said treating method is lower than that achieved by thermal melting of polytetrahydrofuran.

9. The method of claim 7 wherein said microwave energy is characterized by a frequency of from about 2000 Mhz to about 3000 Mz.

10. The method of claim 7 wherein said microwave energy is supplied by a microwave oven having a power rating of about 400 to 750 watts.

11. The method of claim 7 wherein said method results in a reduction of APHA number of up to about 10 APHA color points.

* * * * *